US012202259B2

(12) United States Patent
Hosoda

(10) Patent No.: US 12,202,259 B2
(45) Date of Patent: Jan. 21, 2025

(54) TRANSPORT DEVICE AND RECORDING DEVICE

(71) Applicant: SEIKO EPSON CORPORATION, Tokyo (JP)

(72) Inventor: Yasuhiro Hosoda, Chikuhoku-mi (JP)

(73) Assignee: Seiko Epson Corporation, Tokyo (JP)

( * ) Notice: Subject to any disclaimer, the term of this patent is extended or adjusted under 35 U.S.C. 154(b) by 164 days.

(21) Appl. No.: 18/165,220

(22) Filed: Feb. 6, 2023

(65) Prior Publication Data

US 2023/0249482 A1 Aug. 10, 2023

(30) Foreign Application Priority Data

Feb. 7, 2022 (JP) ................................ 2022-017020

(51) Int. Cl.
*B41J 15/16* (2006.01)
*B41J 15/04* (2006.01)
*B65H 19/18* (2006.01)

(52) U.S. Cl.
CPC ............ *B41J 15/16* (2013.01); *B41J 15/042* (2013.01); *B65H 19/1852* (2013.01); *B65H 19/1878* (2013.01); *B65H 2301/4631* (2013.01); *B65H 2301/51512* (2013.01); *B65H 2406/351* (2013.01); *B65H 2801/15* (2013.01)

(58) Field of Classification Search
CPC ... B41J 32/02; B41J 11/04; B41J 11/14; B41J 11/703; B41J 29/13; B41J 2/32; B41J 3/4075; B41J 15/044
See application file for complete search history.

(56) References Cited

U.S. PATENT DOCUMENTS 6,402,868 B1 * 6/2002 Tagawa ..................... B31F 5/06 156/504
2014/0198148 A1 * 7/2014 Imamura .............. B41J 11/0095 347/16

FOREIGN PATENT DOCUMENTS

JP 2017-087735 A 5/2017

* cited by examiner

*Primary Examiner* — Henok D Legesse
(74) *Attorney, Agent, or Firm* — WORKMAN NYDEGGER

(57) ABSTRACT

A transport device includes a feeding portion feeding a printing medium, a winding portion winding the printing medium fed from the feeding portion, and a coupling portion coupling the printing medium on a feeding side extending from the feeding portion and the printing medium on a winding side extending from the feeding portion between the feeding portion and the winding portion, wherein the coupling portion includes a cutting table supporting the printing medium, a first fixing roll temporarily fixing the printing medium on the feeding side to the cutting table, and a second fixing roll temporarily fixing the printing medium on the winding side to the cutting table, and the first fixing roll and the second fixing roll temporarily fix each printing medium in a state in which a boundary between the printing medium on the feeding side and the printing medium on the winding side is exposed upward.

9 Claims, 12 Drawing Sheets

TRANSPORT DEVICE AND RECORDING DEVICE

The present application is based on, and claims priority from JP Application Serial Number 2022-017020, filed Feb. 7, 2022, the disclosure of which is hereby incorporated by reference herein in its entirety.

BACKGROUND

1. Technical Field

The present disclosure relates to a transport device and a recording device.

2. Related Art

JP 2017-87735 A discloses a printer in which a feeding portion, a process unit, and a winding portion are arrayed in a horizontal direction. In the printer described in JP 2017-87735 A, both ends of a sheet are wound around the feeding portion and the winding portion into a roll shape, respectively, and the sheet is stretched over the feeding portion and the winding portion. The process unit is provided between the feeding portion and the winding portion, and after being subjected to an image recording process by a printing unit, the sheet is transported to a winding shaft. JP 2017-87735 A describes that a sheet extending from the feeding portion and a sheet extending from the winding portion are coupled by a joint tape.

However, in an existing printing machine including a feeding portion and a winding portion, at the time of replacement with a new base material, a downstream end portion of the new base material extending from the feeding portion, and an upstream end portion of an old base material extending from the winding portion may be joined by a joint tape, and transported. As a result, the new base material on a feeding side can be wound by the winding portion, and the new feeding side base material can be automatically passed through a transport path, thereby realizing replacement with the new base material.

When the replacement with the new base material, a user performs first to sixth operations described below. That is, first, a base material is cut off at a cutting table, and the base material on a winding side is fixed to the cutting table with a magnet. Second, a paper tube of a used-up base material is taken out, and a new base material is loaded onto the feeding portion. Third, a new feeding side base material is passed through a transport path, and a downstream end is led out to the cutting table. Fourth, the downstream end of the feeding side base material is fixed to the cutting table with a magnet. Fifth, the winding side base material and the feeding side base material are joined together with a tape at the cutting table. Sixth, the magnets on the winding side and the feeding side are removed from the cutting table.

However, in the above-described replacement operation, the magnet may slip out from the cutting table, when the magnet with weak magnetic force is used, or a user accidentally touches the magnet with strong force during the replacement operation, or the like. When the magnet slips out from the cutting table, even when the base material is passed through the transport path, the base material may fall out from the transport path. Also, after the base material is cut, the base material is applied with transport force without joining the base materials together with a tape, in some cases. In this case, a printing machine winds the original base material while the feeding side base material is not joined.

In these cases, a working time is increased since a work of passing the base material again through the transport path occurs, or the like. Originally, in the application of the tape by the user, the joint of the base materials may be insufficient, and there is a possibility that a working time increases as the base materials separate from each other during transportation.

SUMMARY

An aspect of the present disclosure is a transport device including a feeding portion configured to feed a medium, a winding portion configured to wind the medium fed from the feeding portion, and a coupling portion configured to couple a first medium extending from the feeding portion and a second medium extending from the winding portion, between the feeding portion and the winding portion, wherein the coupling portion includes a support portion for supporting the medium, a first fixing portion for temporarily fixing the first medium to the support portion, and a second fixing portion for temporarily fixing the second medium to the support portion, and the first fixing portion and the second fixing portion temporarily fix the media respectively, in a state where a boundary between the first medium and the second medium is exposed upward.

Another aspect of the present disclosure is a recording device including a transport device for transporting a medium, and a recording unit for recording an image on the medium transported by the transport device, wherein the transport device includes a feeding portion for feeding the medium, a winding portion for winding the medium fed from the feeding portion, and a coupling portion for coupling a first medium extending from the feeding portion and a second medium extending from the winding portion, between the feeding portion and the winding portion, the coupling portion includes a support portion for supporting the medium, a first fixing portion for temporarily fixing the first medium to the support portion, and a second fixing portion for temporarily fixing the second medium to the support portion, and the first fixing portion and the second fixing portion temporarily fix the media respectively, in a state where a boundary between the first medium and the second medium is exposed upward.

DESCRIPTION OF EXEMPLARY EMBODIMENTS

Preferred exemplary embodiments of the present disclosure will be described in detail using the figures hereinafter. Note that the exemplary embodiments described hereinafter are not intended to limit the content of the present disclosure as set forth in the claims. In addition, all of the configurations described hereinafter are not necessarily essential constituent requirements of the present disclosure.

1. First Exemplary Embodiment

1-1. Overview of Printing Apparatus

Figure 1:
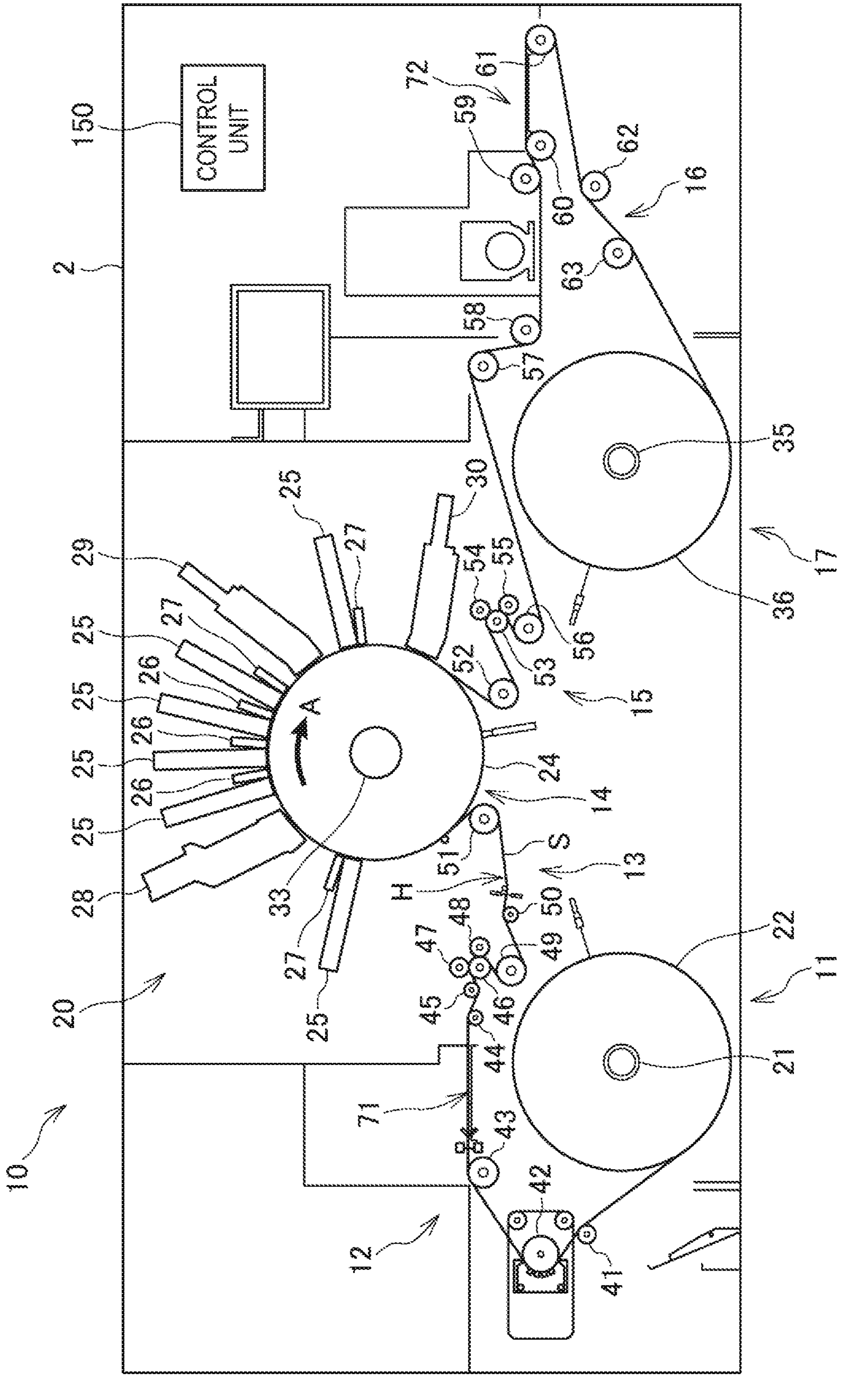
FIG. 1 is a diagram illustrating an overview of a printing apparatus according to a first exemplary embodiment.

FIG. 1 is a diagram illustrating an overview of a printing apparatus 1 according to a first exemplary embodiment.

FIG. 1 illustrates an X-axis, a Y-axis, and a Z-axis. The X-axis, the Y-axis, and the Z-axis are mutually orthogonal. The Z-axis extends in a vertical direction. The Z-axis indicates an up-down direction in an installation state of the printing apparatus 1. The X-axis extends in a horizontal direction. The X-axis indicates a left-right direction of the printing apparatus 1. The Y-axis extends in the horizontal direction. The Y-axis indicates a front-rear direction of the printing apparatus 1. The front-rear direction of the printing apparatus 1 is a width direction of a printing medium S. A positive direction indicated by an arrow of the Z-axis indicates an upward direction. A positive direction indicated by an arrow of the X-axis indicates a rightward direction. A positive direction indicated by an arrow of the Y-axis indicates a forward direction. Note that, in each of the figures, for convenience of understanding, each member is illustrated in a different scale from that of an entity.

The printing apparatus 1 is ink jet-type that forms an image by discharging ink onto the printing medium S. Various sheets can be used as the printing medium S used in the printing apparatus 1. For example, as the printing medium S, paper such as plain paper or high-quality paper, or a film made of a synthetic resin can be utilized. The printing device 1 corresponds to an example of a recording device. The printing medium S corresponds to an example of a medium.

The printing apparatus 1 includes a transport device 10 that transports the printing medium S, a printing unit 20 that prints an image on the printing medium S transported by the transport device 10, and a control unit 150 that controls each unit of the printing apparatus 1. Note that, in the following description, "upstream" and "downstream" are used in a sense of upstream and downstream with respect to a transport direction of the printing medium S. The printing unit 20 corresponds to an example of a recording unit.

The transport device 10 of the printing apparatus 1 includes a feeding portion 11 that feeds the printing medium S.

The feeding portion 11 includes a cylindrical or columnar feeding shaft 21. A feeding roll 22 in which the printing medium S is wound into a roll shape is mounted on the feeding shaft 21. The printing medium S is fed from the feeding roll 22 by rotation of the feeding shaft 21. A diameter of the feeding roll 22 decreases in accordance with a feeding amount of the printing medium S. The feeding shaft 21 rotates by power of a feeding motor 23 illustrated in FIG. 5.

A feeding transport unit 12 is disposed downstream the feeding portion 11.

The feeding transport unit 12 includes transport rollers 41, 42, and 43. The transport rollers 41 to 43 are disposed to the left of the feeding shaft 21. The most downstream transport roller 43 is disposed above the feeding shaft 21. In the present exemplary embodiment, a predetermined roller among the transport rollers 41 to 63 of a medium transport unit 3 is configured to be driven by a transport motor 40 illustrated in FIG. 5.

A supplying transport unit 13 is disposed downstream the feeding transport unit 12.

The supplying transport unit 13 includes the transport rollers 44, 45, 46, 47, 48, 49, 50, and 51.

Here, the most upstream transport roller 44 overlaps the most downstream transport roller 43 of the feeding transport unit 12 in a height direction. The printing medium S from the feeding transport unit 12 is received by the most upstream transport roller 44.

Also, the transport roller 46, and the transport rollers 47 and 48 are disposed facing each other. The transport roller 46, and the transport rollers 47 and 48 sandwich and transport the printing medium S.

Furthermore, the most downstream transport roller 51 supports the printing medium S in proximity to an outer peripheral surface of a platen drum 24.

A printing transport unit 14 is disposed downstream the supplying transport unit 13.

The printing transport 14 includes the platen drum 24. The platen drum 24 is a cylindrical drum that rotates about a rotary shaft 33. The platen drum 24 supports the printing medium S on the outer peripheral surface thereof. The platen drum 24 rotates in a direction of an arrow A. The platen drum 24 transports the printing medium S in the direction of the arrow A. That is, the direction of the arrow A is the transport direction of the printing medium S.

A discharging transport unit 15 is disposed downstream the printing transport unit 14.

The discharging transport unit 15 includes the transport rollers 52, 53, 54, 55, 56, 57, 58, 59, and 60. Of these, the most upstream transport roller 52 bends the printing medium S so as to be wound around the outer peripheral surface of the platen drum 24, and supports the printing medium S. Also, the transport roller 53, and the transport rollers 54 and 55 are disposed facing each other. The transport roller 53, and the transport rollers 54 and 55 sandwich and transport the printing medium S.

A winding transport unit 16 is disposed downstream the discharging transport unit 15.

The winding transport unit 16 includes the transport rollers 61, 62, and 63. Of these, the most upstream transport roller 61 overlaps the most downstream transport roller 60 of the discharging transport unit 15 in the height direction. The printing medium S from the discharging transport unit 15 is received by the most upstream transport roller 61.

The winding portion 17 is disposed downstream the winding transport unit 16.

The winding portion 17 includes a winding shaft 35 that is rotatably supported. A winding roll 36 is supported by the winding shaft 35. In the winding portion 17, the printing medium S is wound, and the printing medium S is collected as the roll-shaped winding roll 36. The winding shaft 35 rotates by power of a winding motor 37 illustrated in FIG. 5.

The transport device 10 of the present exemplary embodiment is configured by the feeding portion 11, the feeding transport unit 12, the supplying transport unit 13, the printing transport unit 14, the discharging transport unit 15, the winding transport unit 16, and the winding portion 17. A transport path H is formed by the plurality of transport rollers 41 to 63, and the platen drum 24. The transport rollers 41 to 63, and the platen drum 24 rotate by power of the transport motor 40 illustrated in FIG. 5.

A plurality of recording heads 25, a plurality of pinning units 26, 27, a plurality of UV irradiators 28, 29, and 30 are disposed around the platen drum 24, along the outer peripheral surface of the platen drum 24.

The recording head 25 discharges a UV ink that cures by irradiation with ultraviolet rays. The recording head 25 discharges the UV ink having a different color, and a material for each recording head 25.

The pinning unit 26 and 27 collect mist generated when the UV ink is discharged from the recording head 25. Also, the pinning unit 26 irradiates with UV rays to temporarily cure the UV ink.

The UV irradiators 28 to 30 irradiate with UV rays to cure the UV ink. UV is an abbreviation for ultraviolet.

The printing unit 20 of the present exemplary embodiment is configured by the platen drum 24, the plurality of recording heads 25, the plurality of pinning units 26, 27, and the plurality of UV irradiators 28 to 30.

The transport device 10, the printing unit 20, and the control unit 150 are accommodated in a housing 2.

Here, an upstream coupling portion 71 is provided between the feeding transport unit 12 and the supplying transport unit 13 of the transport device 10. The upstream coupling portion 71 is exposed outward from the housing 2. In the upstream coupling portion 71, the printing medium S is transported in the horizontal direction. In the upstream coupling portion 71, work on the printing medium S is performed by a user, when the feeding roll 22 is replaced.

A downstream coupling portion 72 is provided between the discharging transport unit 15 and the winding transport unit 16 of the transport device 10. In the downstream coupling portion 72, the printing medium S is transported in the horizontal direction. The downstream coupling portion 72 is exposed outward from the housing 2. In the downstream coupling portion 72, work on the printing medium S is performed by the user, when the winding roll 36 is replaced.

1-2. Configuration of Coupling Portion

Figure 2:
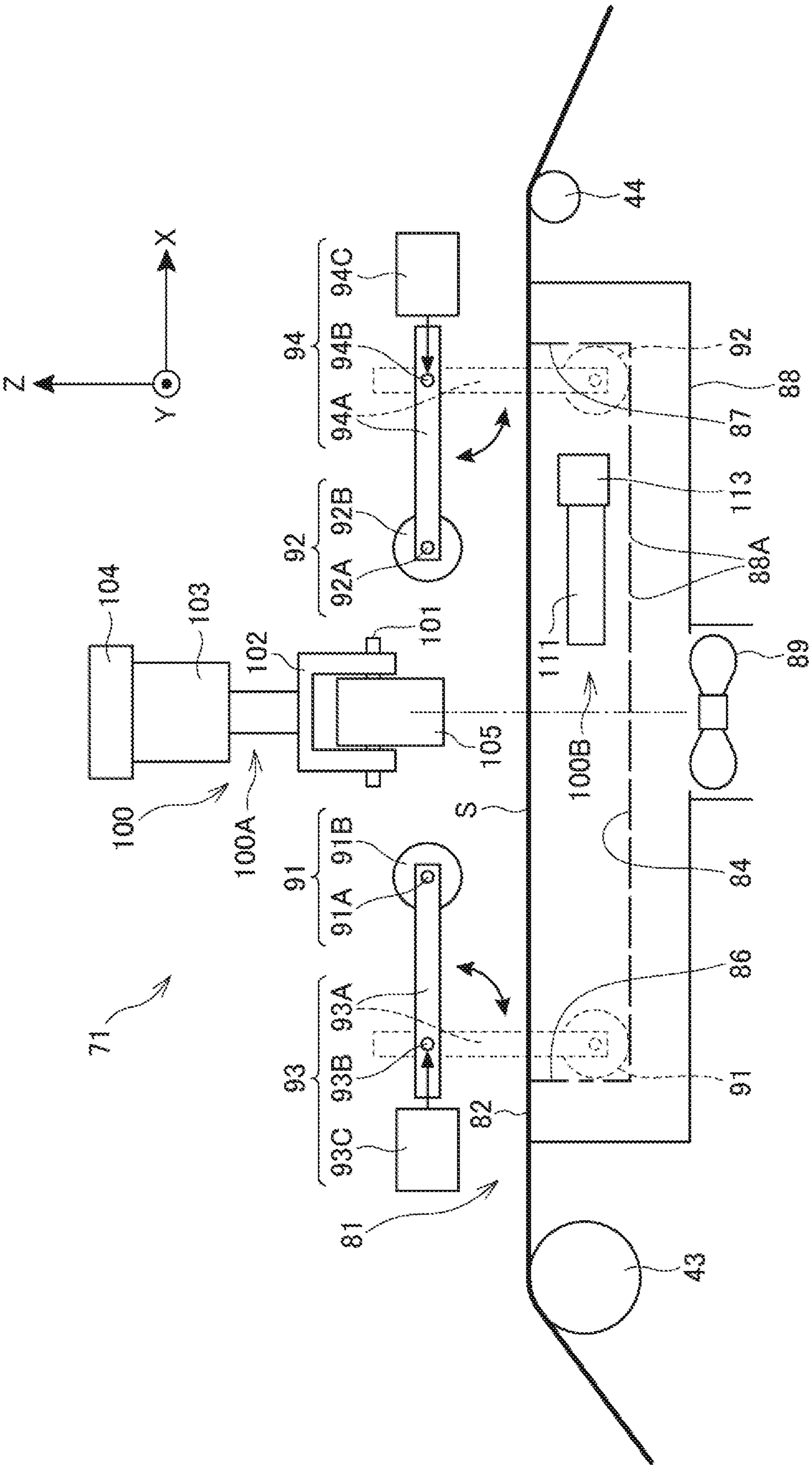
FIG. 2 is an enlarged view of an upstream coupling portion.

FIG. 2 is an enlarged view of the upstream coupling portion 71.

The upstream coupling portion 71 includes a cutting table 81. The cutting table 81 includes a transport surface 82. The transport surface 82 includes the planar transport surface 82 that binds an upper portion of the transport roller 43 and an upper portion of the transport roller 44. A recessed portion 83 recessed downward is formed in the transport surface 82. The recessed portion 83 is constituted by a working surface 84 corresponding to a bottom surface, and a peripheral side surface 85 formed around the working surface 84. The upstream coupling portion 71 corresponds to an example of a coupling portion. The cutting table 81 corresponds to an example of a support portion. The transport surface 82 corresponds to an example of a first surface. The working surface 84 corresponds to an example of a second surface.

The peripheral side surface 85 includes an upstream side surface 86 formed at an upstream end of the working surface 84, and a downstream side surface 87 formed at a downstream end of the working surface 84. The upstream side surface 86 and the downstream side surface 87 extend in the vertical direction. The working surface 84 is formed to be parallel to the transport surface 82. The working surface 84 is formed to be lower than the transport surface 82. The upstream side surface 86 and the downstream side surface 87 extend in the vertical direction.

A pair of fixing rolls 91 and 92 are disposed in the transport direction above the recessed portion 83. The first fixing roll 91 includes a roll shaft 91A extending in the front-rear direction. A cylindrical roll body 91B is rotatably supported by the roll shaft 91A. An outer peripheral surface of the roll body 91B has elasticity. The roll body 91B is, for example, a rubber roller.

The first fixing roll 91 is supported by a first lifting mechanism 93. The first lifting mechanism 93 of the present exemplary embodiment includes an arm 93A, a rotary shaft 93B that swingably supports the arm 93A, and a lifting drive source 93C that imparts forward/backward driving force to the rotary shaft 93B. The lifting drive source 93C is, for example, an electric motor capable of rotating forward/backward. The lifting drive source 93C imparts driving force via a deceleration mechanism (not illustrated), so that the arm 93A swings in the up-down direction about the rotary shaft 93B. As a result, the first fixing roll 91 is supported so as to be capable of lifting or lowering. The first fixing roll 91 corresponds to an example of a first fixing portion.

The first fixing roll 91 is movably supported between a temporarily fixed position where the printing medium S on the feeding portion 11 side is pressed against the working surface 84 and the upstream side surface 86 of the cutting table 81, and a retracted position retracted from the temporarily fixed position and retracted above the transport surface 82. The temporarily fixed position of the first fixing roll 91 is a position indicated by dashed lines in FIG. 2, and the retracted position is a position indicated by solid lines in FIG. 2. Instead of the configuration in which the first fixing roll 91 swings to lift and lower, a configuration may be adopted in which the first fixing roll 91 contacts the working surface 84 while contacting the upstream side surface 86 or moves upward the transport surface 82 to lift and lower.

The second fixing roll 92 is configured similarly to the first fixing roll 91. The second fixing roll 92 includes a roll shaft 92A and a roll body 92B. The second fixing roll 92 is supported by a second lifting mechanism 94. The second lifting mechanism 94 of the present exemplary embodiment is configured similarly to the first lifting mechanism 93 except that the second lifting mechanism 94 is configured to be left-right symmetrical. In other words, the second lifting mechanism 94 includes an arm 94A, a rotary shaft 94B, and a lifting drive source 94C corresponding to the first lifting mechanism 93. The lifting drive source 94C supports the second fixing roll 92 via the arm 94A and the rotary shaft 94B so as to be capable of lifting or lowering. The second fixing roll 92 corresponds to an example of a second fixing portion.

The second fixing roll 92 is movably supported between a temporarily fixed position where the printing medium S on the winding portion 17 side is pressed against the working surface 84 and the downstream side surface 87 of the cutting table 81, and a retracted position retracted from the temporarily fixed position and retracted above the transport surface 82. The temporarily fixed position of the second fixing roll 92 is a position indicated by dashed lines in FIG. 2, and the retracted position is a position indicated by solid lines in FIG. 2. The second fixing roll 92 need not be configured to swing to lift and lower similarly to the first fixing roll 91.

Figure 3:
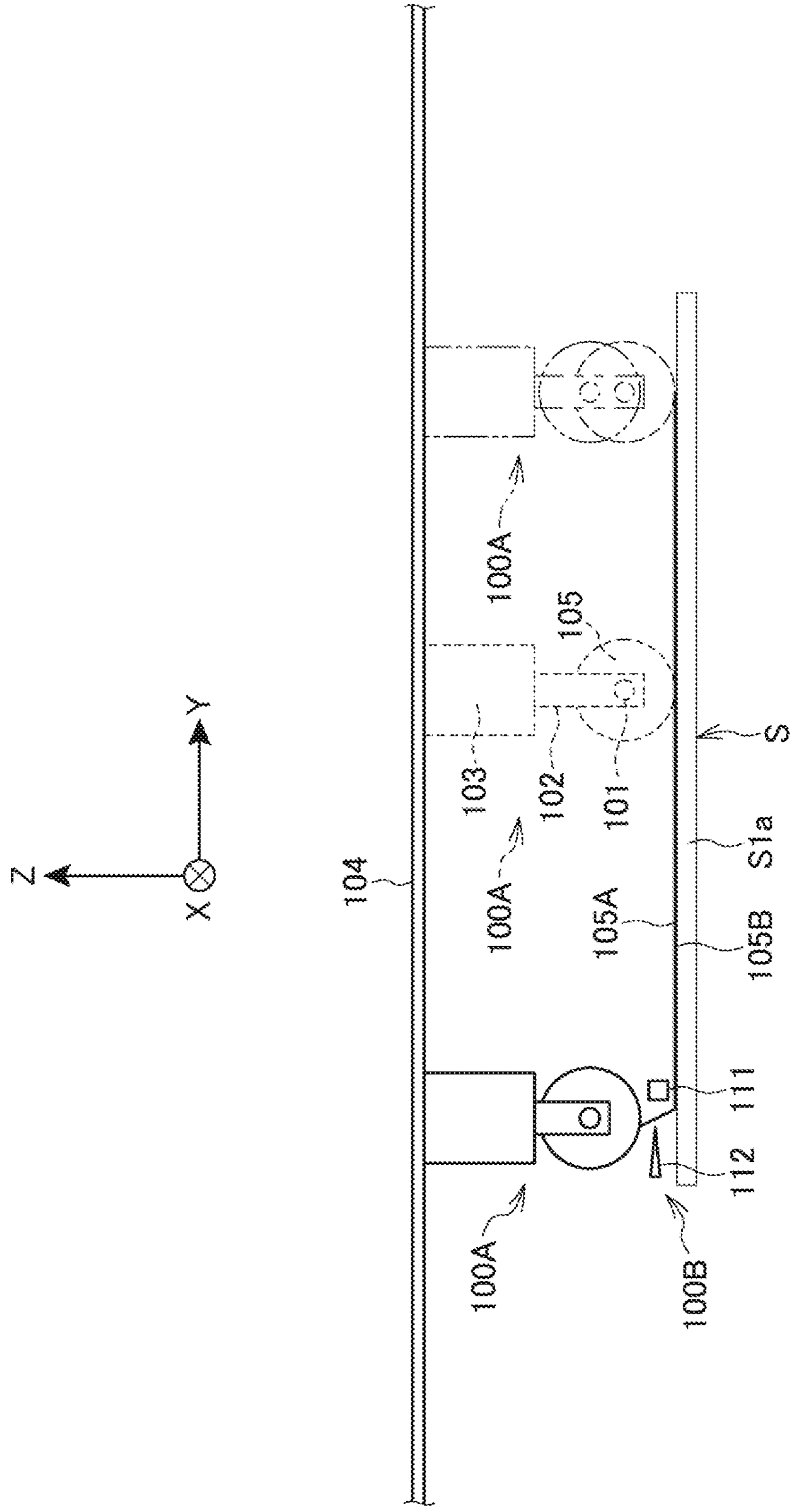
FIG. 3 is a diagram illustrating a taping mechanism of a joining mechanism.
Figure 4:
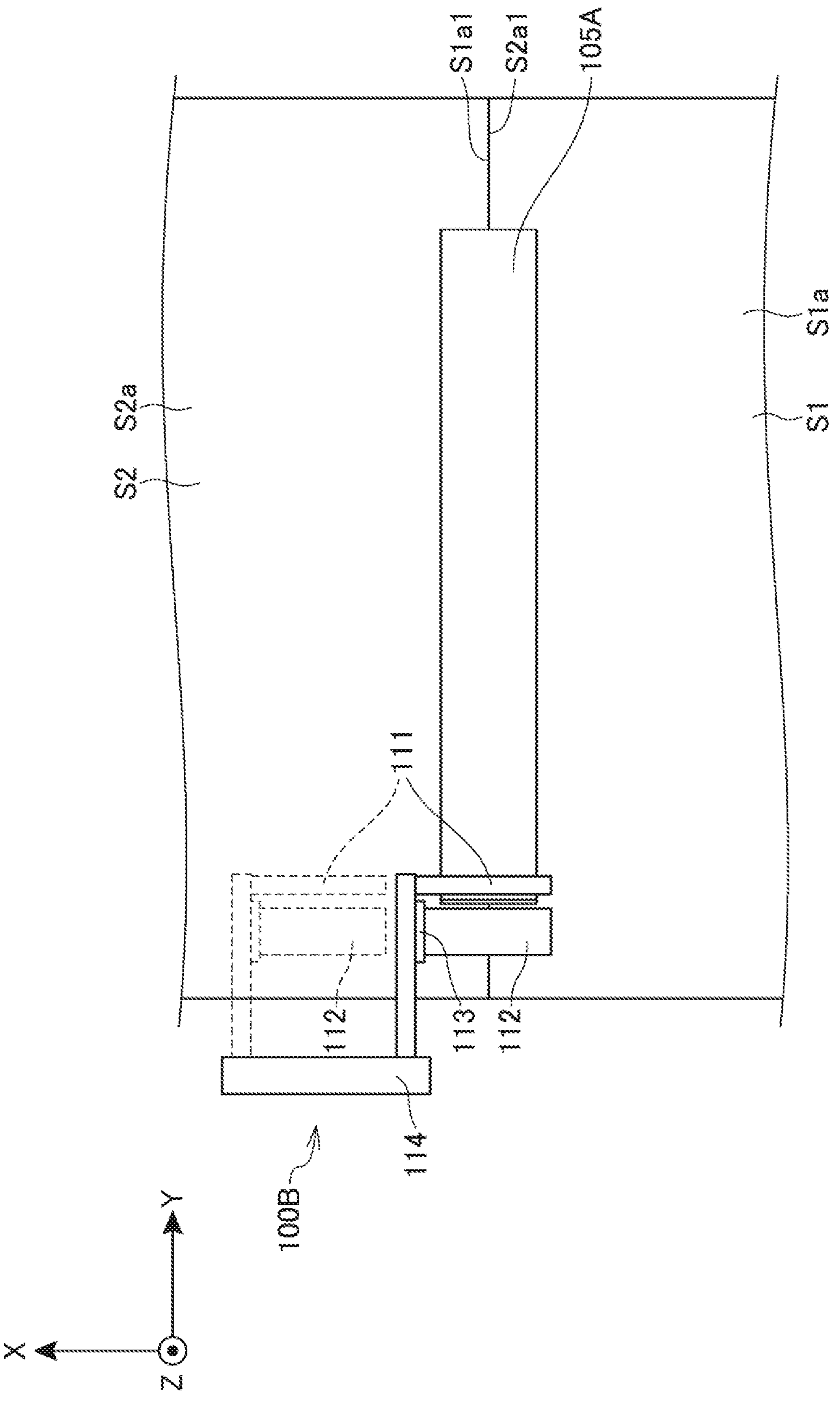
FIG. 4 is a diagram illustrating a cutting mechanism of the joining mechanism.

FIG. 3 is a diagram illustrating a taping mechanism 100A of a joining mechanism 100. FIG. 4 is a diagram illustrating a cutting mechanism 100B of the joining mechanism 100.

The joining mechanism 100 is disposed in the recessed portion 83. The joining mechanism 100 of the present exemplary embodiment includes the taping mechanism 100A, and the cutting mechanism 100B that cuts a tape 105A of the taping mechanism 100A.

As illustrated in FIG. 3, the taping mechanism 100A includes a cylindrical tape mounting portion 101. A roll tape 105 is mounted at the tape mounting portion 101. The roll tape 105 is configured by winding the tape 105A, where an adhesive layer 105B is formed on an outer peripheral surface side, in a roll shape.

The tape mounting portion 101 is rotatably supported by a support bracket 102. The support bracket 102 is supported by a third lifting mechanism 103 so as to be capable of lifting or lowering. The third lifting mechanism 103 is, for example, an electric cylinder. The roll tape 105 of the tape mounting portion 101 is movably supported, by the third lifting mechanism 103, between an application position contacting the working surface 84, and a retracted position retracted above the transport surface 82. The application position of the roll tape 105 is, for example, a position indicated by dotted lines in FIG. 3. The retracted position of the roll tape 105 is, for example, a position indicated by solid lines in FIG. 3. The third lifting mechanism 103 is supported by a sliding mechanism 104 that extends in a direction orthogonal to the transport direction, that is, in the width direction of the printing medium S. The sliding mechanism 104 is, for example, an electric linear guide.

The third lifting mechanism 103 is movable in the front-rear direction by the sliding mechanism 104. Thus, the roll tape 105 of the tape mounting portion 101 is movable in the front-rear direction via the lifting mechanism 103. Here, by the lifting mechanism 103, the tape mounting portion 101 lowers to the application position, and thus the adhesive layer 105B of the tape 105A adheres to printing media S1 and S2. The printing media S1 and S2 are illustrated in FIG. 4. At this time, when the taping mechanism 100A is moved rearward by the sliding mechanism 104, the tape 105A is fed, and the tape 105A is applied to the printing media S1 and S2.

As illustrated in FIG. 4, the cutting mechanism 100B is disposed at a rear part of the working surface 84. The cutting mechanism 100B includes a receiving portion 111 extending in the left-right direction, and a cutter blade 112 facing the receiving portion 111. The cutter blade 112 and the receiving portion 111 are wider than the tape 105A, and are long in the left-right direction. The cutter blade 112 is supported so as to be capable of contacting or separating from the receiving portion 111. The cutter blade 112 is supported by a cut sliding mechanism 113 so as to be capable of being proximity to or spaced apart from the receiving portion 111. The cut sliding mechanism 113 is, for example, an electric cylinder.

The receiving portion 111, the cutter blade 112, and the cut sliding mechanism 113 are supported by a position sliding mechanism 114 so as to be capable sliding in the left-right direction. The position sliding mechanism 114 is, for example, an electric cylinder. This allows movement between a cut position where the receiving portion 111 and the cutter blade 112 sandwich the tape 105A, and a retracted position retracted from the tape 105A. The cut position of the receiving portion 111 and the cutter blade 112 is a position indicated by solid lines in FIG. 4, and the retracted position is a position indicated by dotted lines in FIG. 4.

In the joining mechanism 100 provided with the configuration described above, when the printing medium S1 on the feeding side and the printing medium S2 on the winding side are joined, the taping mechanism 100A is moved forward, and the taping mechanism 100A is lowered. Then, the taping mechanism 100A is moved rearward. At this time, the tape 105A is applied to an upper surface of each of the printing medium S1 on the feeding side and the printing medium S2 on the winding side in a state of spanning across the printing medium S1 on the feeding side and the printing medium S2 on the winding side. When moving to a rear position, the taping mechanism 100A moves to a position where the receiving portion and the cutter blade 112 of the cutting mechanism 100B sandwich the tape 105A. Then, the cutter blade 112 is moved toward the receiving portion 111 and pressured, so that the tape 105A is cut. As a result, the printing medium S1 on the feeding side and the printing medium S2 on the winding side are joined by the tape 105A. The printing medium S1 on the feeding side corresponds to an example of a first medium. The printing medium S2 on the winding side corresponds to an example of a second medium.

As illustrated in FIG. 2, suction holes 88A are formed in the working surface 84, the upstream side surface 86, and the downstream side surface 87 of the cutting table 81. A duct 88 is coupled to the suction hole 88A. A suction fan 89 is disposed at the duct 88. Due to suctioning by the suction fan 89, a negative pressure is created inside the duct 88. Thus, the printing medium S contacting the working surface 84, the upstream side surface 86, and the downstream side surface 87 adheres to the working surface 84, the upstream side surface 86, and the downstream side surface 87, by suctioning, and is unlikely to slide. A suction hole may be provided in the transport surface 82. The suction hole 88A, the duct 88, and the suction fan 89 constitute a suction mechanism 90 of the present exemplary embodiment. The suction hole 88A corresponds to an example of a suction unit.

1-3. Configuration of Control System of Printing Apparatus

Figure 5:
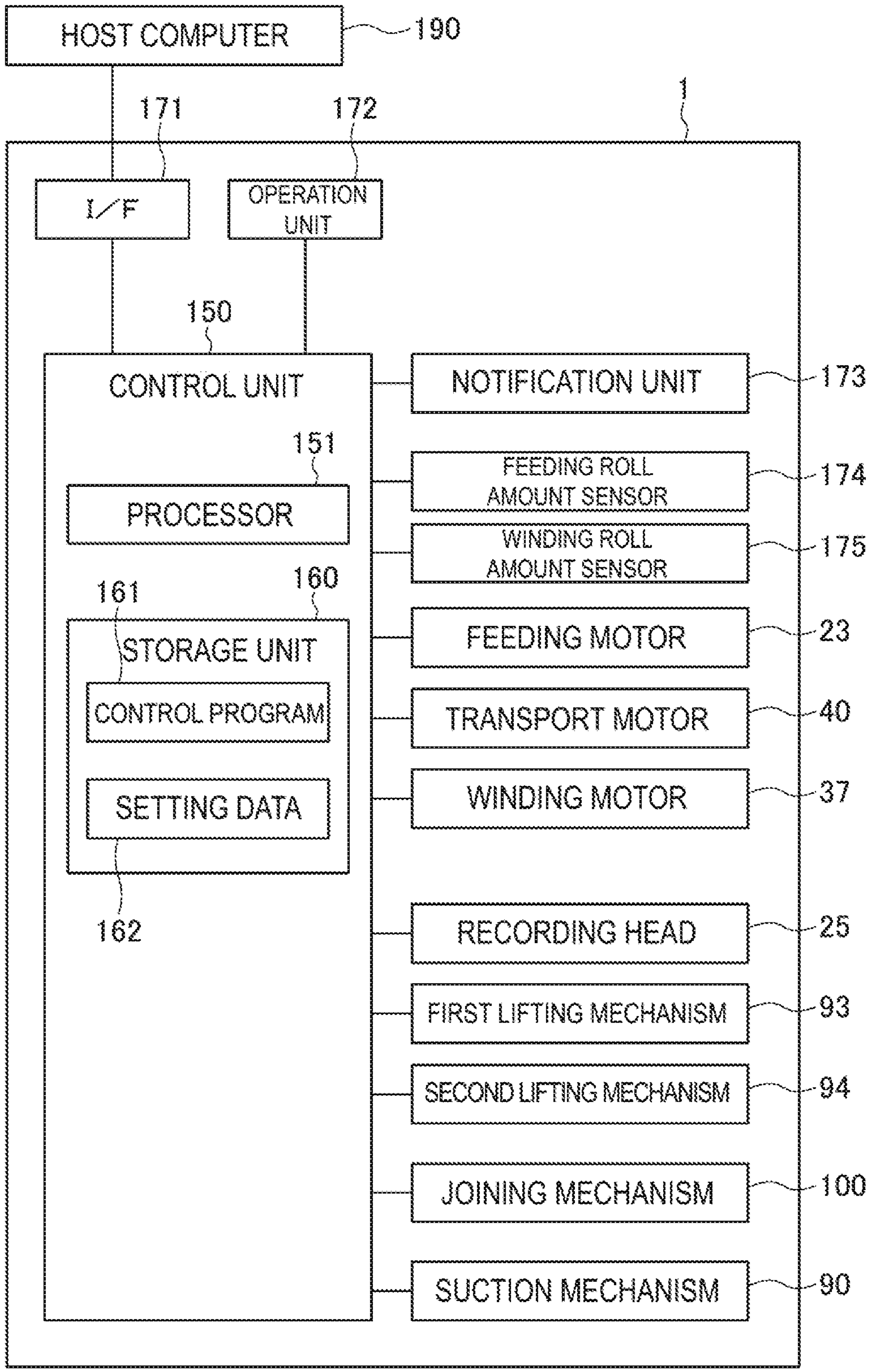
FIG. 5 is a block diagram illustrating a configuration of a main part of a control system of the printing apparatus.

FIG. 5 is a block diagram illustrating a configuration of a main part of a control system of the printing apparatus 1.

The printing apparatus 1 includes the control unit 150 that controls each unit of the printing apparatus 1. The control unit 150 includes a processor 151 that executes a control program, and a storage unit 160. The processor 151 is an arithmetic processing device including a CPU, a DSP, a microcomputer, or the like. Also, the processor 151 may be configured with a plurality of pieces of hardware, or may be configured with a single processor. Further, the processor 151 may be hardware programmed to realize a function of each unit described below.

In other words, the processor 151 may have a configuration in which the control program is mounted as a hardware circuit. In this case, for example, the processor 151 includes an ASIC or an FPGA. The processor 151 executes the control program to realize various functions of the control unit 150. CPU is an abbreviation for Central Processing Unit. DSP is an abbreviation for Digital Signal Processing.

ASIC is an abbreviation for Application Specific Integrated Circuit. FPGA is an abbreviation for Field Programmable Gate Array.

The storage unit 160 includes a storage region for storing the control program to be executed by the processor 151, and data to be processed by the processor 151. The storage unit 160 stores a control program 161 executed by the processor 151, and setting data 162 including various setting values related to operation of the printing apparatus 1. The storage unit 160 includes a non-volatile storage region that stores the control program and the data in a non-volatile manner. Furthermore, the storage unit 160 may include a volatile storage region, and constitute a printing medium S area that temporarily stores the control program executed by the processor 151, and data to be processed.

An interface 171, an operation unit 172, and a notification unit 173 are electrically coupled to the control unit 150. Furthermore, a feeding roll amount sensor 174, and a winding roll amount sensor 175 are electrically coupled to the control unit 150. Furthermore, the feeding motor 23, the transport motor 40, the winding motor 37, and the recording head 25 are electrically coupled to the control unit 150. Furthermore, the first lifting mechanism 93, the second lifting mechanism 94, the joining mechanism 100, and the suction fan 89 are electrically coupled to the control unit 150. Note that in FIG. 5, the interface is abbreviated as I/F.

The interface 171 is coupled to a device outside the printing apparatus 1. In the present exemplary embodiment, a host computer 190 is coupled to the interface 171. The host computer 190 outputs, by the interface 171, data of an image printed by the printing apparatus 1, and print data including printing instructions for the printing apparatus 1, to the printing apparatus 1. The interface 171 may be, for example, a wired interface unit including a connector for coupling a cable and an interface circuit. Further, the interface 171 may be a wireless communication interface that performs wireless data communication with the host computer 190.

The operation unit 172 includes an operator and a touch panel (not illustrated) that accepts operations by a user of the printing apparatus 1. When accepting an operation by the user, the operation unit 172 outputs a signal indicating operation contents to the control unit 150.

The notification unit 173 performs notification under control of the control unit 150. The notification unit 173 includes, for example, a liquid crystal display panel, and displays characters and images indicating notification contents. Further, the notification unit 173 may be configured to include an LED indicator, and light or blink the LED indicator under the control of the control unit 150. The notification unit 173 may be configured to include a speaker and a voice output circuit, and output a notifying sound according to the control by the control unit 150.

LED is an abbreviation for Light Emitting Diode.

The feeding roll amount sensor 174 detects a remaining amount of the feeding roll 22. A detection value of the feeding roll amount sensor 174 is input to the control unit 150.

The winding roll amount sensor 175 detects a winding amount of the winding roll 36. A detection value of the winding roll amount sensor 175 is input to the control unit 150.

The feeding motor 23 drives the feeding shaft 21 under the control of the control unit 150.

The transport motor 40 drives a predetermined transport roller under the control of the control unit 150.

The winding motor 37 drives the winding shaft 35 under the control of the control unit 150.

The recording head 25 performs discharge of the UV ink, and the like, under the control of the control unit 150.

The first lifting mechanism 93 lifts and lowers the first fixing roll 91 under the control of the control unit 150. The second lifting mechanism 94 lifts and lowers the second fixing roll 92 under the control of the control unit 150.

The joining mechanism 100 joins the printing media S1 and S2 under the control of the control unit 150.

The suction mechanism 90 drives the suction fan 89 under the control of the control unit 150.

Figure 6:
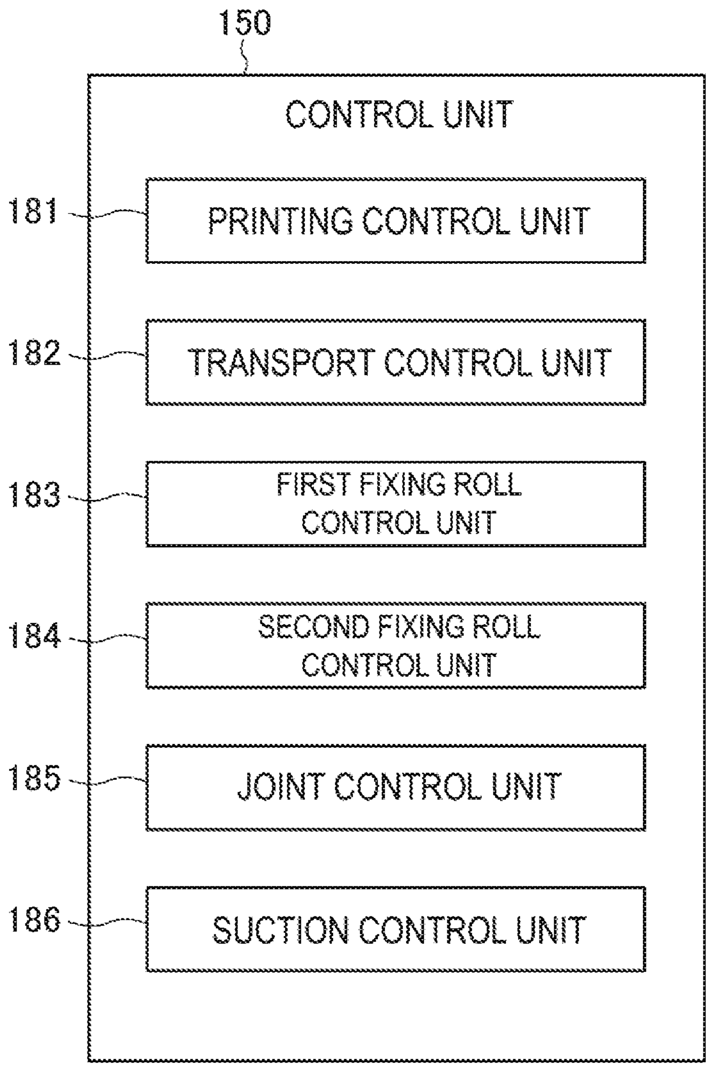
FIG. 6 is a functional block diagram of a control unit.

FIG. 6 is a functional block diagram of the control unit 150.

The control unit 150 includes a printing control unit 181, a transport control unit 182, a first fixing roll control unit 183, a second fixing roll control unit 184, a joint control unit 185, and a suction control unit 186. Each of the units 181 to 186 is realized, as described above, for example, in cooperation of software and hardware by the processor 151 executing the control program 161.

The printing control unit 181 controls the recording head 25, the pinning units 26, 27, and the UV irradiators 28 to 30, based on the print data. Thus, the printing control unit 181 records an image on the printing medium S.

When performing printing based on the print data, the transport control unit 182 controls the feeding motor 23, the transport motor 40, the winding motor 37, and the like. Furthermore, when a replacement start is input from the operation unit 172, the transport control unit 182 stops driving of the feeding motor 23, the transport motor 40, and the winding motor 37. Furthermore, when replacement completion is input from the operation unit 172, the transport control unit 182 drives the feeding motor 23, the transport motor 40, and the winding motor 37.

The first fixing roll control unit 183 controls a lifting position of the first fixing roll 91 by controlling the first lifting mechanism 93. When the replacement completion is input from the operation unit 172, the first fixing roll control unit 183 moves the first fixing roll 91 to the temporarily fixed position. When the operation of the joining mechanism 100 ends, and the printing media S1 and S1 are joined, the first fixing roll control unit 183 moves the first fixing roll 91 to the retracted position.

The second fixing roll control unit 184 controls a lifting position of the second fixing roll 92 by controlling the second lifting mechanism 94. When a replacement start is input from the operation unit 172, the second fixing roll control unit 184 moves the second fixing roll 92 to the temporarily fixed position. When the operation of the joining mechanism 100 ends, and the printing media S1 and S2 are joined, the second fixing roll control unit 184 moves the second fixing roll 92 to the retracted position.

The joint control unit 185 controls the joining mechanism 100 so as to join the printing medium S1 on the feeding side and the printing medium S2 on the winding side. The joint control unit 185 in the present exemplary embodiment moves the roll tape 105 to a front position by controlling the sliding mechanism 104. The front position of the roll tape 105 is a position indicated by two-dot chain lines in FIG. 3. After moving the roll tape 105 to the front position, the joint control unit 185 controls the third lifting mechanism 103 to lower the taping mechanism 100A to an application start position. The application start position of the roll tape 105 is a position indicated by dashed lines in FIG. 3, and is approximately the same position as the front position in the Y-axis direction.

After lowering the roll tape 105 to the application start position, the joint control unit 185 controls the sliding mechanism 104 to move the roll tape 105 backward to an application end position. The application end position of the roll tape 105 is a vicinity of the retracted position or a position that overlaps the retracted position indicated by solid lines in FIG. 3 in the Y-axis direction. At this time, the tape 105A is applied on the printing medium S by the adhesive layer 105B. After moving the roll tape 105 to the application end position, the joint control unit 185 controls the third lifting mechanism 103 to lift the roll tape 105 and move to the retracted position.

After lifting the roll tape 105 to the retracted position, the joint control unit 185 controls the position sliding mechanism 114 to move the cutting mechanism 100B to the cut position. After moving the cutting mechanism 100B to the cut position, the joint control unit 185 controls the cut sliding mechanism 113 to press the cutter blade 112 against the receiving portion 111 and cut the tape 105A.

After cutting the tape 105A, the joint control unit 185 controls the cut sliding mechanism 113 to retract the cutter blade 112 from the receiving portion 111. After retracting the cutter blade 112 from the receiving portion 111, the joint control unit 185 controls the position sliding mechanism 114 to retract the cutting mechanism 100B to an original position.

1-5. Operation of Printing Apparatus

Figure 7:
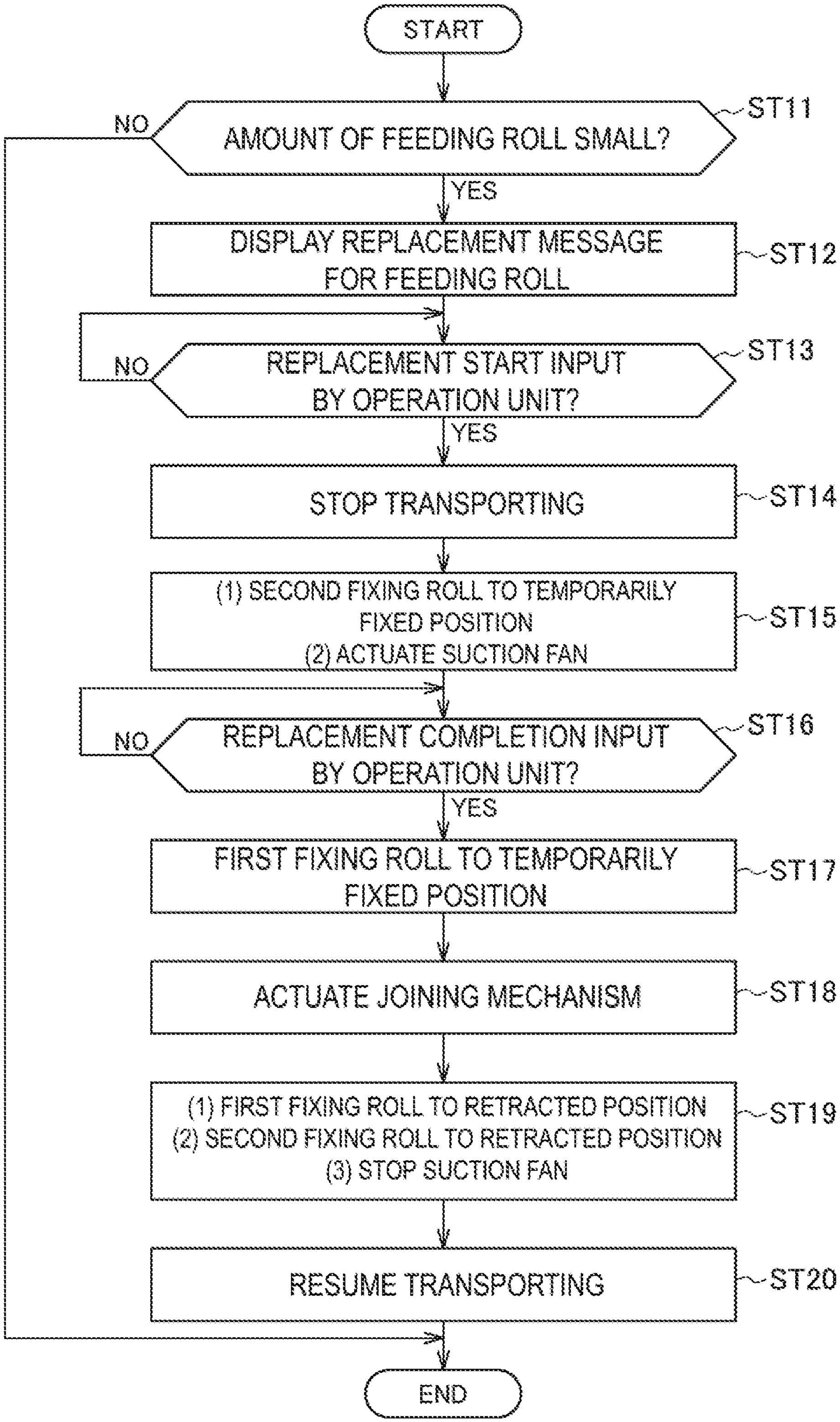
FIG. 7 is a flowchart illustrating operation of the printing apparatus.

FIG. 7 is a flowchart illustrating operation of the printing apparatus 1.

The printing apparatus 1 repeatedly performs the operation illustrated in FIG. 7 at a predetermined period while a power supply of the printing apparatus 1 is ON.

The control unit 150 determines whether a remaining amount of the feeding roll 22 is small or not based on the feeding roll amount sensor 174 (step ST11).

When determining that the remaining amount of the feeding roll 22 is not small (step ST11; NO), the control unit 150 ends processing of the operation illustrated in FIG. 7.

When determining that the remaining amount of the feeding roll 22 is small (step ST11; YES), the control unit 150 displays a message prompting roll replacement of the feeding roll 22 on the notification unit 173 (step ST12).

After displaying the above message on the notification unit 173, the control unit 150 determines, regarding whether to start replacement of the feeding roll 22 or not, whether a replacement start is input by the operation unit 172 or not (step ST13).

When determining that a replacement start is not input (step ST13; NO), the control unit 150 repeats the processing of step ST13.

When determining that a replacement start is input (step ST13; YES), the control unit 150 stops the transport by the transport device 10 (step ST14).

After stopping the transport, the control unit 150 actuates the suction fan 89 and moves the second fixing roll 92 to the temporarily fixed position (step ST15). Thus, by the second fixing roll 92, the printing medium S is held in a state of being pressed against two surfaces of the working surface 84 and the downstream side surface 87, and brought into a briefly fixed state, that is, temporarily fixed. Thus, a contact area is large and more reliably retained. At this time, since the suction fan 89 is actuated, it is easy to reliably perform the temporary fixing.

After moving the second fixing roll 92 to the temporarily fixed position, the control unit 150 determines, regarding whether the replacement of the new feeding roll 22 is completed or not, whether replacement completion is input by the operation unit 172 or not (step ST16).

When determining that replacement completion is not input (step ST16; NO), the control unit 150 repeats the processing of step ST16.

When determining that replacement completion is input (step ST16; YES), the control unit 150 moves the first fixing roll 91 to the temporarily fixed position (step ST17).

Figure 8:
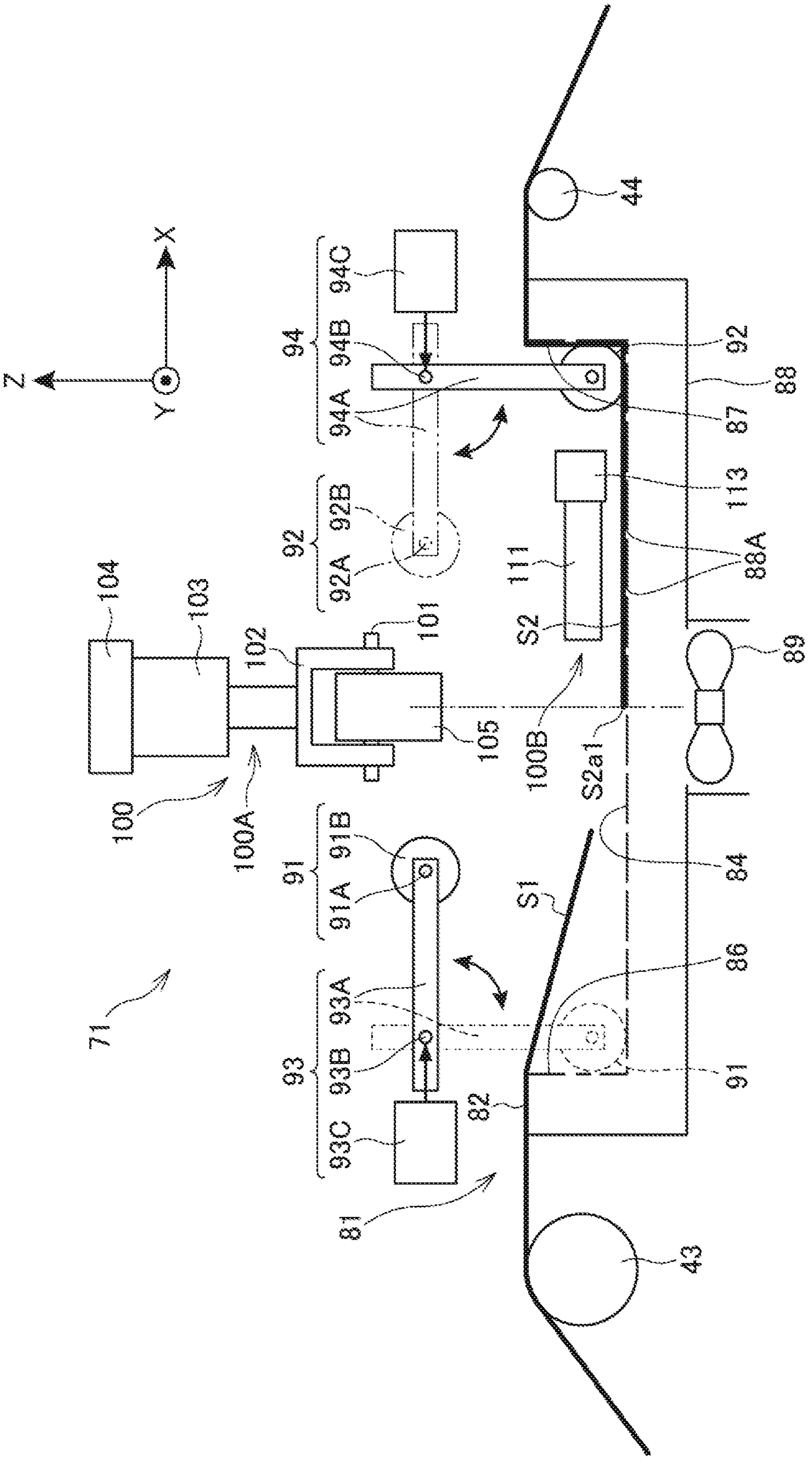
FIG. 8 is a diagram illustrating a state in which a second fixing roll is moved to a temporarily fixed position.
Figure 9:
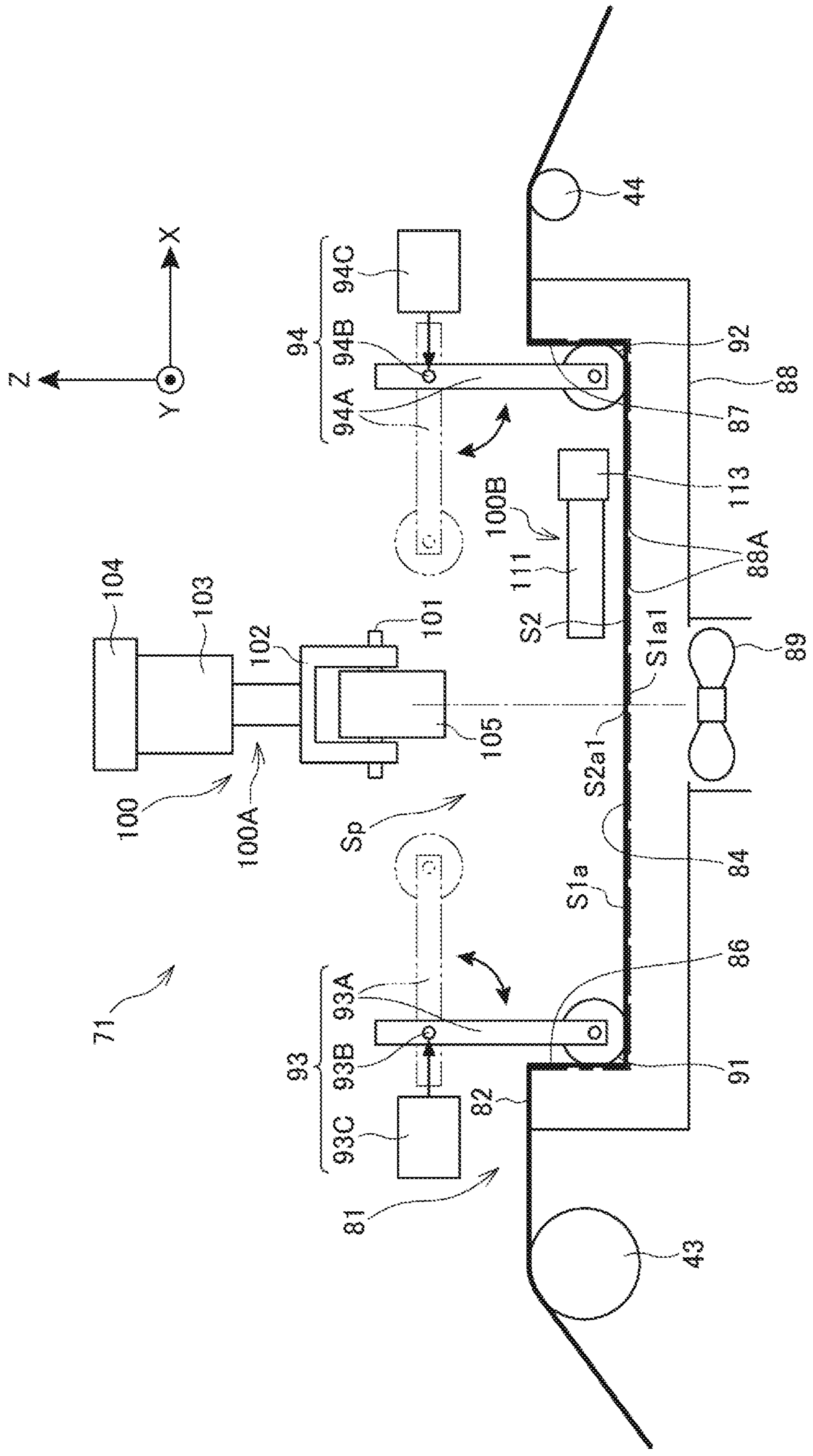
FIG. 9 is a diagram illustrating a state in which a first fixing roll is moved to a temporarily fixed position.

FIG. 8 is a diagram illustrating a state in which the second fixing roll 92 is moved to the temporarily fixed position. FIG. 9 is a diagram illustrating a state in which the first fixing roll 91 is moved to the temporarily fixed position.

In step ST16 to ST17, as illustrated in FIG. 8, before inputting replacement completion, the user cuts the printing medium S on the cutting table 81, and separates the printing medium S into the printing medium S1 on the feeding side and the printing medium S2 on the winding side. The printing medium S2 on the winding side is temporarily fixed by the second fixing roll 92, and thus can be cut while being prevented from being transported into a device main body.

Then, the feeding roll 22 having a small remaining amount on the feeding side is replaced with the new feeding roll 22. When the new feeding roll 22 is set to the feeding portion 11 by the user, a downstream end S1*a*1 of the feeding roll 22 is passed through the transport rollers 41 to 43, and led out to the upstream coupling portion 71 as illustrated in FIG. 9. The downstream end S1*a*1 is aligned with an upstream end S2*a*1 of the winding roll 36. Note that, a position of the tape 105A of the taping mechanism 100A may be adjusted at this time.

When the first fixing roll 91 moves to the temporarily fixed position, the printing medium S is held in a state of being pressed against two surfaces of the working surface 84 and the upstream side surface 86, and temporarily fixed, by the first fixing roll 91. Thus, a contact area is large and more reliably retained. At this time, the printing medium S1 on the feeding side is pressed against the work surface 84 by the first fixing roll 91, and the printing medium S2 on the winding side is pressed against the working surface 84 by the second fixing roll 92. Thus, each of the printing medium S1 on the feeding side, and the printing medium S2 on the winding side is disposed in a planar shape on the working surface 84.

The control unit 150 actuates the joining mechanism 100 to join the printing medium S1 on the feeding side and the printing medium S2 on the winding side (step ST18).

When the operation by the joining mechanism 100 is completed, the control unit 150 lifts each of the first fixing roll 91 and the second fixing roll 92 to the retracted position, and stops driving of the suction fan 89 (step ST19).

The control unit 150 drives the transport device 10 to resume the transport (step ST20). When the transport is resumed, the control unit 150 ends the processing of the operation illustrated in FIG. 7.

Here, in the present exemplary embodiment, when the feeding roll 22 is replaced, the fixing rolls 91 and 92 controlled by the control unit 150 temporarily fix the printing media S, S1, and S2. Therefore, the temporary fixing is easily and reliably performed, as compared to a case where the printing media S to S2 are temporarily fixed by magnets, for example. Thus, the printing medium S is not wound up on the winding portion 17 side, and it is easy to cut the printing medium S. Note that, instead of the configuration in which the user performs cutting, a configuration may be adopted in which a cutting mechanism of the printing medium S is provided at the upstream coupling portion 71, and the control unit 150 controls the cutting mechanism to cut the printing medium S.

In addition, cutting is performed, the old feeding roll 22 is replaced with the new feeding roll 22, the new feeding roll 22 is passed through to the feeding transport unit 12, and the downstream end S1*a*1 of the printing medium S1 of the feeding roll 22 is led out to a predetermined position in a cutting unit. The predetermined position is, for example, a position corresponding to the upstream end S2*a*1 of the printing medium S2 on the winding side. At this time, by the user inputting into the operation unit 172, the first fixing roll 91 temporarily fixes the printing medium S1 on the feeding side. Then, in a state of being pressed against the cutting table 81 and temporarily fixed, the printing medium S1 on the feeding side and the printing medium S2 on the winding side are automatically joined by the joining mechanism 100. Therefore, it is possible to easily and accurately perform joining, as compared to a case where the user performs joining. The joined printing media S1 and S2 are transported to the winding portion 17 along the transport path H by driving of the transport device 10.

1-7. Actions of Exemplary Embodiment

As described above, the transport device 10 according to the present exemplary embodiment includes the feeding portion 11 that feeds the printing media S and S1, and the winding portion 17 that winds the printing media S and S2 fed from the feeding portion 11. Further, the transport device 10 includes the coupling portions 71 and 72 for coupling the printing medium S1 on the feeding side extending from the feeding portion 11 and the printing medium S2 on the winding side extending from the winding portion 17 between the feeding portion 11 and the winding portion 17. In the transport device 10, the upstream coupling portion 71 includes the cutting table 81 that supports the printing media S to S2. Further, the transport device 10 includes the first fixing roll 91 that temporarily fixes the printing medium S1 on the feeding side to the cutting table 81, and the second fixing roll 92 that temporarily fixes the printing medium S2 on the winding side to the cutting table 81. The first fixing roll 91 and the second fixing roll 92 temporarily fix the printing media S1 and S2, respectively, in a state where the downstream end S1*a*1 as an example of a boundary between the printing medium S1 on the feeding side and the printing medium S2 on the winding side is exposed upward.

According to this configuration, the printing medium S1 on the feeding side and the printing medium S2 on the winding side are reliably temporarily fixed to the cutting table 81 of the upstream coupling portion 71, that is, briefly fixing is easily and reliably performed. At this time, the first fixing roll 91 and the second fixing roll 92 temporarily fix the printing media S1 and S2, respectively, in a state where the boundary between the printing medium S1 on the feeding side and the printing medium S2 on the winding side is exposed upward. Thus, a space Sp is formed between the first fixing roll 91 and the second fixing roll 92, and this space Sp can be used to make the printing medium S1 on the feeding side and the printing medium S2 on the winding side easier to join. Therefore, it is possible to suppress an increase in a working time of a replacement work of the printing medium S1 due to insufficient temporary fixing.

In the present exemplary embodiment, the cutting table 81 includes the transport surface 82 that supports the printing media S to S2, and the working surface 84 that supports the printing media S to S2 at a position lower than the transport surface 82. The first fixing roll 91 temporarily fixes the printing medium S1 on the feeding side to the working surface 84. The second fixing roll 92 temporarily fixes the printing medium S2 on the winding side to the working surface 84.

According to this configuration, it is easy to increase a contact area between the fixing rolls 91 and 92 and the printing medium S to S2 using a height difference between the transport surface 82 and the working surface 84, and thus the printing media S to S2 can be temporarily fixed more reliably.

Additionally, in the present exemplary embodiment, in the transport direction of the printing media S to S2, the upstream side surface 86 coupled to the transport surface 82 on an upstream end side of the working surface 84 is formed at the upstream end of the working surface 84. The downstream side surface 87 coupled to the transport surface 82 on a downstream end side of the working surface 84 is formed at the downstream end of the working surface 84. The first fixing roll 91 temporarily fixes the printing medium S1 on the feeding side to the working surface 84 and the upstream side surface 86. The second fixing roll 92 temporarily fixes the printing medium S2 on the winding side to the working surface 84 and the downstream side surface 87.

According to this configuration, a contact area between the printing media S to S2 and the cutting table 81 can be easily increased, and, the printing media S, S1, and S2 can be more reliably temporarily fixed.

Additionally, in the present exemplary embodiment, the upstream coupling portion 71 includes the joining mechanism 100 that joins a downstream end portion S1*a* of the printing medium S1 on the feeding side and an upstream end portion S2*a* of the printing medium S2 on the winding side.

According to this configuration, the printing medium S1 on the feeding side and the printing medium S2 on the winding side can be joined.

In addition, in the present exemplary embodiment, the joining mechanism 100 is the taping mechanism that applies the tape 105A across the downstream end S1*a* of the printing medium S1 on the feeding side and the upstream end S2*a* of the printing medium S2 on the winding side.

According to this configuration, the printing medium S1 on the feeding side and the printing medium S2 on the winding side can be joined with the tape 105A.

In addition, in the present exemplary embodiment, the suction hole 88A is provided, at the cutting table 81, that brings the printing media S to S2 in close contact with the cutting table 81 by suctioning.

According to this configuration, by the suction hole 88A, the printing medium S to S2 can be adsorbed to the cutting table, and more reliably temporarily fixed.

In the present exemplary embodiment, the printing apparatus 1 includes the transport device 10 that transports the printing medium S to S2, and the printing unit 20 that records an image on the printing medium S transported by the transport device 10.

According to this configuration, even in the printing apparatus 1, an increase in an operation time of a replacement work of the printing media S to S2 can be suppressed along with insufficient temporary fixing, as in the transport device 10.

2. Second Exemplary Embodiment

2-1. Configuration of Printing Apparatus

Next, a second exemplary embodiment will be described. Note that parts identical to those in the first exemplary embodiment described above will be denoted by the same reference signs and descriptions thereof will be omitted.

Figure 10:
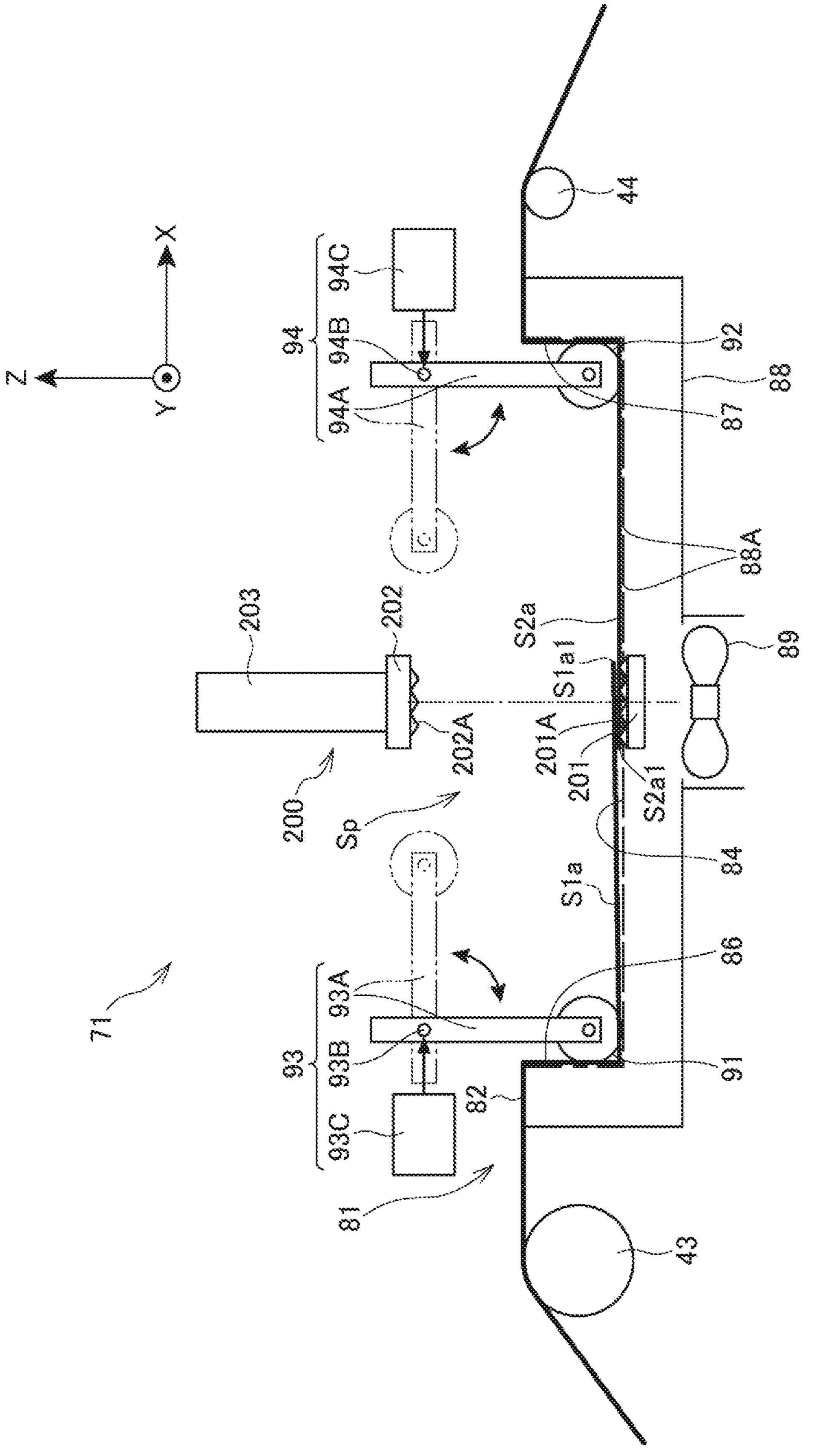
FIG. 10 is an enlarged view of a printing apparatus according to a second exemplary embodiment.

FIG. 10 is an enlarged view of the printing apparatus 1 according to the second exemplary embodiment.

A joining mechanism 200 in the second exemplary embodiment is constituted by a crimping mechanism instead of the taping mechanism 100A and the cutting mechanism 100B. The joining mechanism 200 includes a pair of crimping portions 201 and 202 disposed in an up-down direction. Each of the crimping portions 201 and 202 has a plate shape extending in a front-rear direction. The first crimping portion 201 is provided at the working surface 84. Recessing and protruding teeth 201A are formed at an upper surface of the first crimping portion 201.

The second crimping portion 202 is disposed above the first crimping portion 201. Recessing and protruding teeth 202A that mesh with the recessing and protruding teeth 201A of the first crimping portion 201 are formed at a lower surface of the second crimping portion 202. The recessing and protruding teeth 202A of the second crimping portion 202 are supported by a lifting mechanism 203. The lifting mechanism 203 is, for example, an electric cylinder. The lifting mechanism 203 presses the second crimping portion 202 against the first crimping portion 201, and the recessing and protruding teeth 201A of the first crimping portion 201 and the recessing and protruding teeth 202A of the second crimping portion 202 mesh with each other. The printing medium S1 on a feeding side and the printing medium S2 on a winding side are crimped by the recessing and protruding teeth 201A and the recessing and protruding teeth 202A meshing with each other.

In the second exemplary embodiment, when replacement, for example, the downstream end S1*a*1 of the printing medium S1 on the feeding side is brought into a state of being superimposed on the upstream end S2*a*1 of the printing medium S2 on the winding side. Then, when an end of replacement is input, the printing medium S1 on the feeding side is temporarily fixed by the first fixing roll 91, and the downstream end portion S1*a* of the printing medium S1 on the feeding side and the upstream end portion S2*a* of the printing medium S2 on the winding side are held in a superimposed state. At this time, the printing medium S1 on the feeding side and the printing medium S2 on the winding side can be crimped and jointed by the recesses and protrusions by the joining mechanism 200, which is a pressure contact mechanism.

2-2. Actions of Exemplary Embodiment

In the present exemplary embodiment, the joining mechanism 200 is the crimping mechanism that crimps and joins the downstream end portion S1*a* of the printing medium S1 on the feeding side and the upstream end portion S2*a* of the printing medium S2 on the winding side.

According to this configuration, the printing medium S1 on the feeding side and the printing medium S2 on the winding side can be joined by crimping.

3. Third Exemplary Embodiment 3-1. Configuration of Printing Apparatus

Next, a third exemplary embodiment will be described. Note that parts identical to those in the first exemplary embodiment described above will be denoted by the same reference signs and descriptions thereof will be omitted.

Figure 11:
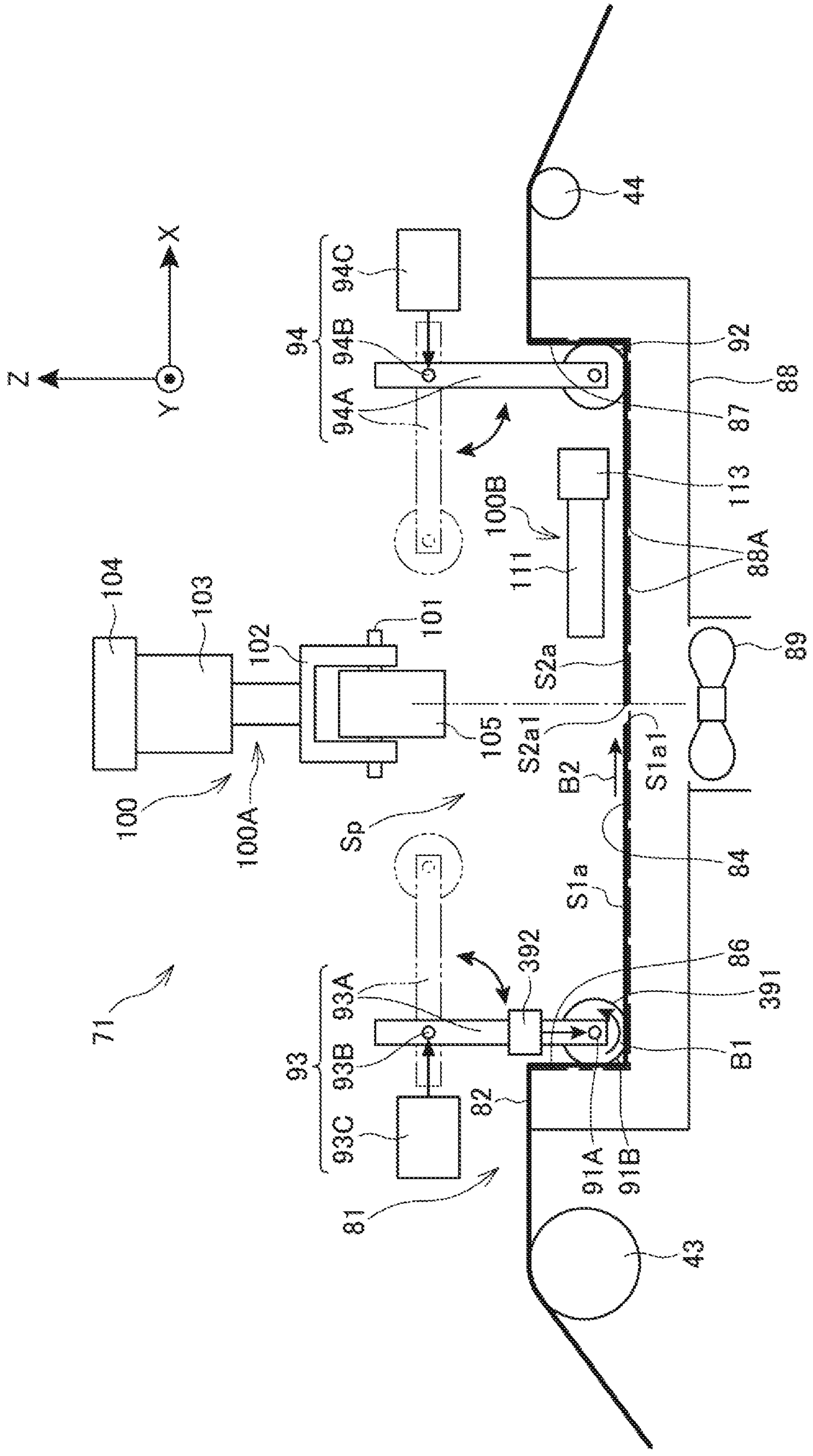
FIG. 11 is an enlarged view of a printing apparatus according to a third exemplary embodiment.

FIG. 11 is an enlarged view of the printing apparatus 1 according to the third exemplary embodiment.

In the third exemplary embodiment, a configuration is adopted in which a first fixing roll 391 can be driven. A drive source 392 is coupled to a roll shaft 91A of the first fixing roll 391 via a transmission gear (not illustrated). The drive source 392 is, for example, a stepper motor.

In the third exemplary embodiment, when the first fixing roll 391 moves to a temporarily fixed position, the drive source 392 is controlled by the control unit 150 to move, in a direction B1, the downstream end S1*a* of the printing medium S1 on a feeding side downstream. Specifically, in FIG. 9, a roll body 91B is rotated in a counterclockwise direction B2 with respect to the roll shaft 91A. When the printing medium S1 on the feeding side is temporarily fixed by the first fixing roll 391, the downstream end S1*a* is likely to be pulled to the feeding portion 11 side. However, by rotating the first fixing roll 91 by a predetermined amount, the printing medium S1 on the feeding side can be transported downstream, and a position of the downstream end S1*a*1 can be easily set. Thus, the printing media S1 and S2 are easily disposed at an appropriate position when joining is performed by the joining mechanism 100, and the joining is easily and reliably performed.

3-2. Actions of Exemplary Embodiment

In the present exemplary embodiment, the first fixing roll 391 is a driving roller.

According to this configuration, the first fixing roll 91 can be driven, and thus the temporarily fixed printing media S and S1 can be transported, and position adjustment of the printing media S and S1 can be performed.

4. Fourth Exemplary Embodiment 4-1. Configuration of Printing Apparatus

Next, a fourth exemplary embodiment will be described. Note that parts identical to those in the third exemplary embodiment described above will be denoted by the same reference signs and descriptions thereof will be omitted.

Figure 12:
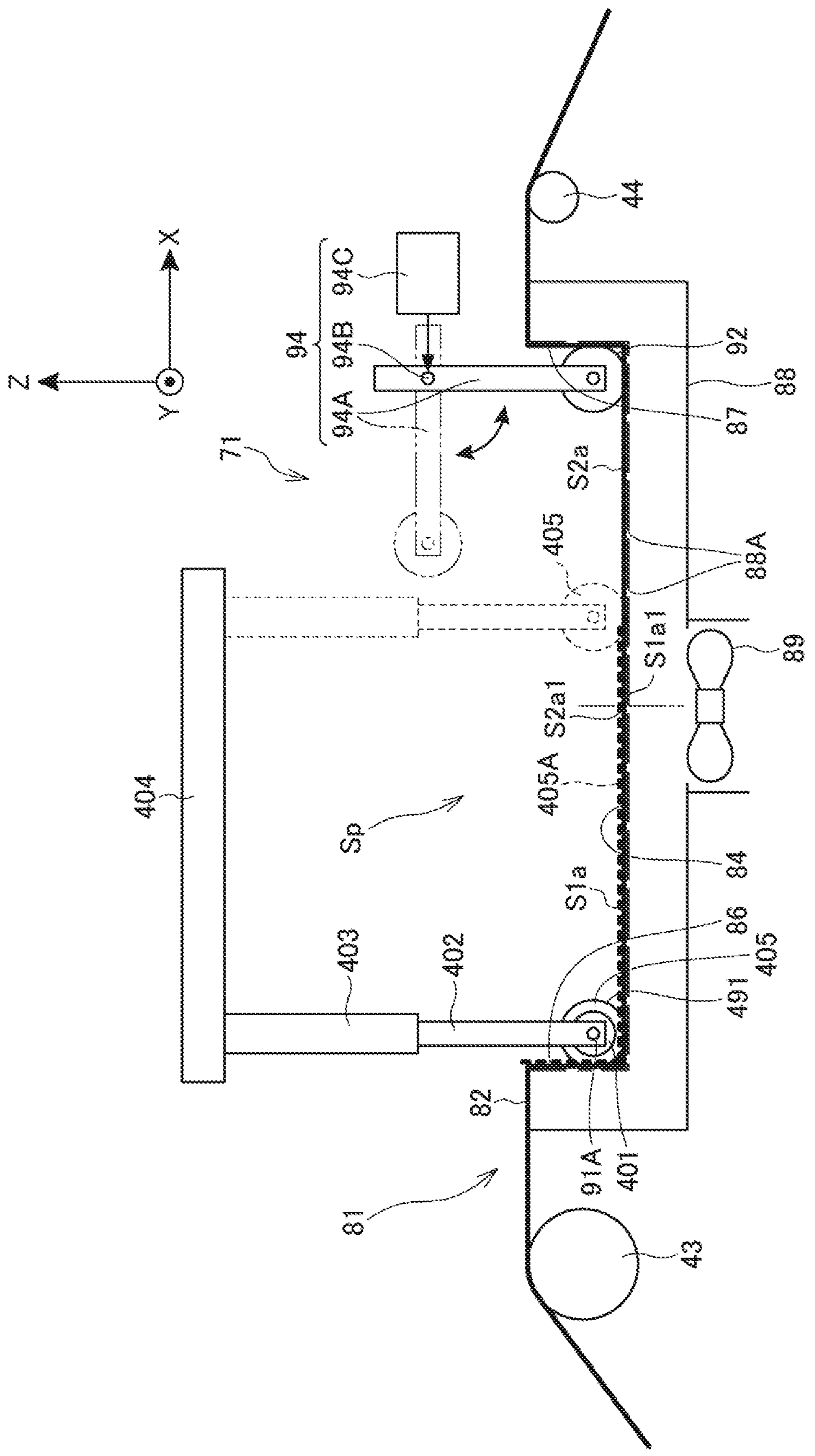
FIG. 12 is an enlarged view of a printing apparatus according to a fourth exemplary embodiment.

FIG. 12 is an enlarged view of the printing apparatus 1 according to the fourth exemplary embodiment.

In the fourth exemplary embodiment, the joining mechanism 100 is omitted. In the fourth exemplary embodiment, a first fixing roll 491 has a function of a joining mechanism. That is, in the first fixing roll 491, a cylindrical tape mounting portion 401 is supported by the roll shaft 91A. A roll tape 405 is mounted at the tape mounting portion 401.

The tape mounting portion 401 is rotatably supported by a support bracket 402 via the roll shaft 91A. The support bracket 402 is supported by a lifting mechanism 403 so as to be capable of lifting. The lifting mechanism 403 is, for example, an electric cylinder. By the lifting mechanism 403, the roll tape 405 of the tape mounting portion 401 is supported so as to be capable of moving between an application position contacting the working surface 84 and a retracted position (not illustrated) retracted above the transport surface 82. The application position of the roll tape 405 is, for example, a position indicated by solid lines in FIG. 12. The lifting mechanism 403 is supported by a sliding mechanism 404 extending in a transport direction, that is, in the transport direction of the printing medium S. The sliding mechanism 404 is, for example, an electric linear guide.

In the fourth exemplary embodiment, the first fixing roll 491 lowers toward a temporarily fixed position at a position where contact with the upstream side surface 86 is possible. Accordingly, the printing medium S1 on a feeding side is pressed against the upstream side surface 86 and the working surface 84, and temporarily fixed. At this time, the roll tape 405 of the first fixing roll 491 adheres to the printing medium S1. When the first fixing roll 491 is moved along the X-axis to an upper surface of the printing medium S2 on a winding side, as indicated by dotted lines in FIG. 12, the roll tape 405 is rotated and a tape 405A is fed, and an upper surface of the printing medium S1 and the upper surface of the printing medium S2 are joined. Thus, also in the present exemplary embodiment, the printing media S1 and S2 are reliably easily joined.

5. Other Exemplary Embodiments

The exemplary embodiments described above are merely specific aspects for implementing the present disclosure described in the claims, and are not intended to limit the present disclosure, and can be implemented in various aspects, for example, as illustrated below, without departing from the gist of the disclosure.

In the exemplary embodiments described above, the configuration has been illustrated in which the cutting table 81, the first fixing roll 91, the second fixing roll 92 are disposed at the upstream coupling portion 71 of the printing apparatus 1, but the cutting table 81, the first fixing roll 91, and the second fixing roll 92 may be disposed at the downstream coupling portion 72.

Although the configuration of the printing apparatus 1 including the transport device 10 has been described in the above-described exemplary embodiments, the present disclosure is not limited to the printing apparatus 1, and may be applied to a transport device including a feeding shaft and a winding shaft.

In the exemplary embodiment described above, the configuration of each of the lifting mechanism 93, 94, 103, 203, and 403 has been described, but the lifting mechanism 93 to 403 are not limited to the configurations of the exemplary embodiments. For example, as the lifting mechanisms 93 to 403, any lifting configuration can be employed such as a solenoid and a spring, a cam and a spring, a motor and a gear, or a rack-and-pinion.

In the exemplary embodiments described above, the configuration of each of the sliding mechanisms 104, 113, 114, and the like has been described, but the sliding mechanisms 104 to 114 are not limited to the configurations of the exemplary embodiment. For example, as the sliding mechanisms 104 to 114, any sliding configuration can be employed such as an electric cylinder, a rack-and-pinion, a belt and a pulley, or the like.

In the exemplary embodiments described above, it is desirable to form the working surface 84 in which the recessed portion 83 is formed in the transport surface 82, but the recessed portion 83 may be omitted, and the stepped working surface 84 may be omitted. That is, an upper surface of the cutting table 81 may be flush.

In the exemplary embodiments described above, the embodiments of the fixing rolls 91 and 92 have been described as the fixing portion, but a prismatic shape may be used, not the roll shape.

Also, the functional block described using the figure is the schematic diagram illustrating the functional configuration of each apparatus classified in accordance with the main processing content in order to facilitate understanding of the present disclosure. The configuration of each apparatus can also be classified into more components depending on the processing content. Also, classification can be performed such that one component can perform more processing. Further, the processing of each component may be performed in one piece of hardware, or may be performed in multiple pieces of hardware. Further, the processing of each component may be implemented in one program, or may be implemented in a plurality of programs.

Further, processing units in the flowchart illustrated in the figure are obtained by dividing the processing based on the main processing content in order to facilitate the understanding of the processing in each apparatus. The present disclosure is not limited by the way of dividing the processing units or the names thereof. The processing of each apparatus can be divided into more processing units depending on the processing content. Also, one processing unit can be divided to include more processing. Furthermore, the processing order of the above-described flowchart is also not limited to the illustrated example as far as similar processing can be performed.

What is claimed is:

1. A transport device, comprising:

a feeding portion configured to feed a medium;

a winding portion configured to wind the medium fed from the feeding portion; and a coupling portion configured to couple a first medium extending from the feeding portion and a second medium extending from the winding portion between the feeding portion and the winding portion, wherein the coupling portion includes a support portion for supporting the medium, a first fixing portion for temporarily fixing the first medium to the support portion, and a second fixing portion for temporarily fixing the second medium to the support portion, and the first fixing portion and the second fixing portion temporarily fix the media respectively, in a state where a boundary between the first medium and the second medium is exposed upward.

2. The transport device according to claim 1, wherein the support portion includes a first surface supporting the medium, and a second surface supporting the medium at a position lower than the first surface, the first fixing portion temporarily fixes the first medium to the second surface, and the second fixing portion temporarily fixes the second medium to the second surface.

3. The transport device according to claim 2, wherein in a transport direction of the medium, an upstream side surface coupled to the first surface on an upstream end side of the second surface is formed at an upstream end of the second surface, and a downstream side surface coupled to the first surface on a downstream end side of the second surface is formed at a downstream end of the second surface, the first fixing portion temporarily fixes the first medium to the second surface and the upstream side surface, and the second fixing portion temporarily fixes the second medium to the second surface and the downstream side surface.

4. The transport device according to claim 1, wherein the coupling portion includes a joining mechanism for joining a downstream end portion of the first medium and an upstream end portion of the second medium.

5. The transport device according to claim 4, wherein the joining mechanism is a taping mechanism for applying a tape across the downstream end portion of the first medium and the upstream end portion of the second medium.

6. The transport device according to claim 4, wherein the joining mechanism is a crimping mechanism for crimping and joining the downstream end portion of the first medium and the upstream end portion of the second medium.

7. The transport device according to claim 4, wherein at least one of the first fixing portion and the second fixing portion is a driving roller.

8. The transport device according to claim 1, wherein the support portion is provided with a suction unit for bringing the medium into close contact with the support portion by suctioning.

9. A recording device including a transport device for transporting a medium, and a recording unit for recording an image on the medium transported by the transport device, wherein the transport device includes a feeding portion for feeding the medium, a winding portion for winding the medium fed from the feeding portion, and a coupling portion for coupling a first medium extending from the feeding portion and a second medium extending from the winding portion, between the feeding portion and the winding portion, the coupling portion includes a support portion for supporting the medium, a first fixing portion for temporarily fixing the first medium to the support portion, and a second fixing portion for temporarily fixing the second medium to the support portion, and the first fixing portion and the second fixing portion temporarily fix the media respectively, in a state where a boundary between the first medium and the second medium is exposed upward.

* * * * *